United States Patent [19]

Itoh

[11] 3,789,386

[45] Jan. 29, 1974

[54] RESTORATION SYSTEM FOR PATTERN INFORMATION USING AND-TYPE LOGIC OF ADJACENT BITS

[75] Inventor: Takayuki Itoh, Kawasaki, Japan

[73] Assignee: Takachiho Koeki Kabushiki Kaisha, Osaka-shi, Japan

[22] Filed: June 30, 1972

[21] Appl. No.: 268,137

[52] U.S. Cl. .................... 340/324 AD, 178/DIG. 3

[51] Int. Cl. .................... G06f 3/14

[58] Field of Search .......... 340/324 AD; 178/DIG. 3

[56] References Cited

UNITED STATES PATENTS 3,573,789 4/1971 Sharp et al. .................. 340/324 AD

*Primary Examiner*—John W. Caldwell
*Assistant Examiner*—Marshall M. Curtis
*Attorney, Agent, or Firm*—Robert E. Burns et al.

[57] ABSTRACT

A restoration system is disclosed for restoring omitted dots of dot-typed patterns indicated by an alternate arrangement of black dots and white dots in bilateral scanning lines and vertical scanning lines in which some dots of each of the dot-typed patterns omitted in a pattern generator or in the transmission medium because of noise are restored irrespective of the states of the dots if upper and lower dots and right and left dots adjacent to each of the omitted dots assume predetermined states determined in consideration of the characteristics of the patterns. The dot-typed omitted pattern is temporarily stored in a shift register, and AND logic operations are performed by use of AND circuits to detect the predetermined states.

6 Claims, 7 Drawing Figures

PATENTED JAN 29 1974 3,789,386

SHEET 4 OF 4

RESTORATION SYSTEM FOR PATTERN INFORMATION USING AND-TYPE LOGIC OF ADJACENT BITS

This invention relates to restoration systems for pattern information and, more particularly, to restoration systems for restoring omitted dots of dot-typed patterns.

For generating a dot-typed pattern of a character, picture etc., some dots are omitted in a predetermined manner to reduce the necessary bits for indicating each pattern or because of noise. In this case, the dot-typed pattern having the omitted dots is usually displayed without restoration of the omitted dots in conventional arts. Accordingly, the displayed pattern is not legible because of omitted constructive elements.

An object of this invention is to provide a restoration system for pattern information capable of being representative of a greater amount of information by use of a smaller number of dots.

Another object of this invention is to provide restoration system for pattern information in which some dots of a pattern omitted in generating the pattern are effective restored so that constructive elements of the pattern are substantially restored for display.

Another object of this invention is to provide a restoration system for pattern information capable of forming a legible pattern by a smaller number of dots.

In accordance with the principle of this invention, some dots of dot-typed patterns omitted intentionally or unintentionally are restored irrespective of the states of the dots when upper and lower dots and right and left dots adjacent to each of the omitted dots assume predetermined states determined in consideration of the characteristics of the patterns.

The principle, construction and operation of the present invention will be understood from the following more detailed discussion taken in conjunction with the accompanying drawings, in which.

Figure 1:
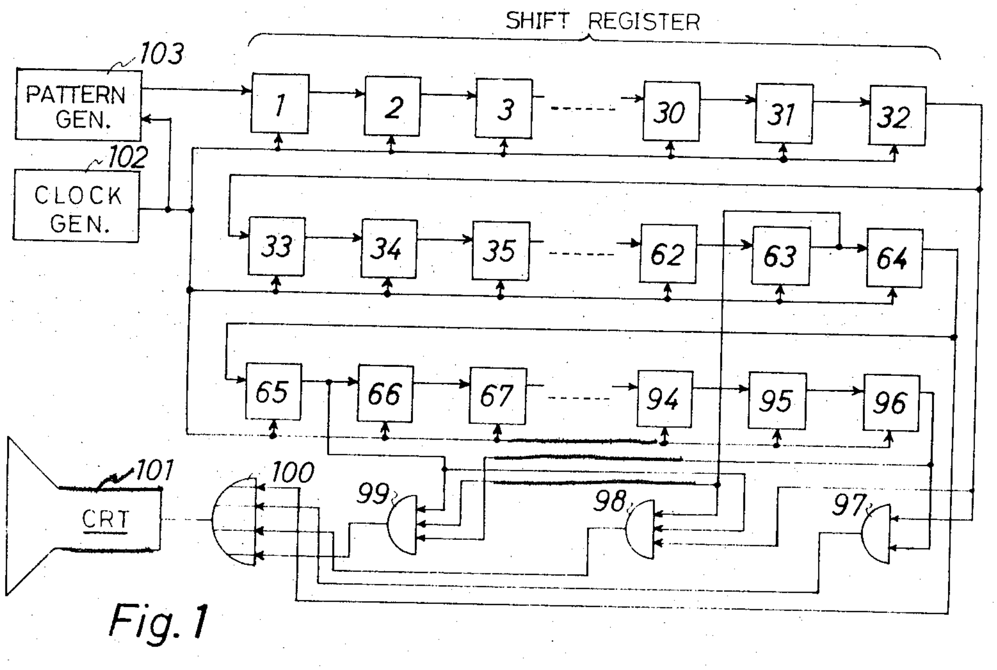
FIG. 1 is a block diagram illustrating an embodiment of this invention.
Figure 2:
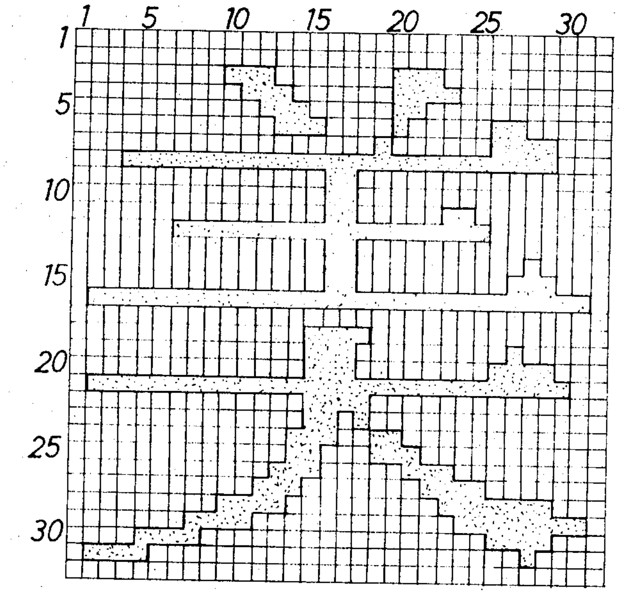
FIG. 2 is a character pattern illustrated in a secton plane of 32 by 32 dots.
Figure 3:
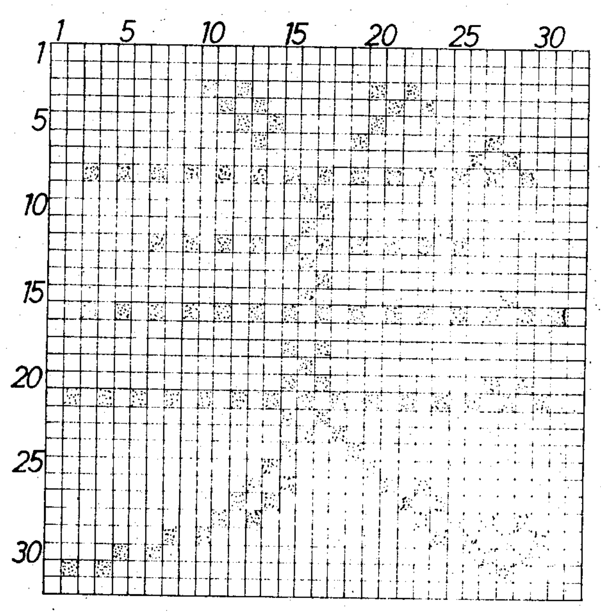
FIG. 3 is a character pattern in which some dots are omitted.

A first embodiment illustrated in FIG. 1 is provided to restore character patterns of Mincho-type having lateral fine components. In FIG. 2, a character pattern of Mincho-type having a meaning "beauty" is shown in a section plane of 32 by 32 dots. In FIG. 3, the character pattern shown in FIG. 2 is modified to that a series of black along bilateral scanning lines and vertical scanning lines is indicated by an alternate arrangement of black dots and white dots. A clock generator 102 generates clock pules with a constant period. A pattern generator 103 generates a character pattern by successively scanning sections shown in FIG. 3 in a downward direction by way of example. The character pattern generated from the pattern generator 103 is transmitted through a transmission medium and applied to a shift register comprising ninety-six bistable circuits 1 to 96. In the transmission medium, the character pattern may be bilaterally or vertically condensed so as to eliminate the white dots in the above alternate arrangement and again expanded as shown in FIG. 3 to reduce the necessary number of dots of each pattern. Since the number of sections in a column of the section pattern shown in FIG. 3 is equal to 32, a right dot of a dot of a character pattern of FIG. 3 stored in one (e.g. a bistable circuit 64) of the bistable circuits 1 to 96 is stored in a bistable circuit 96 for the dot stored in the bistable circuit 64; a left dot of the dot stored in the bistable circuit 64 is stored in a bistable circuit 32; an upper dot of the dot stored in the bistable circuit 64 is stored in a bistable circuit 63; and a lower dot of the dot stored in the bistable circuit 64 is stored in a bistable circuit 65.

Figure 4:
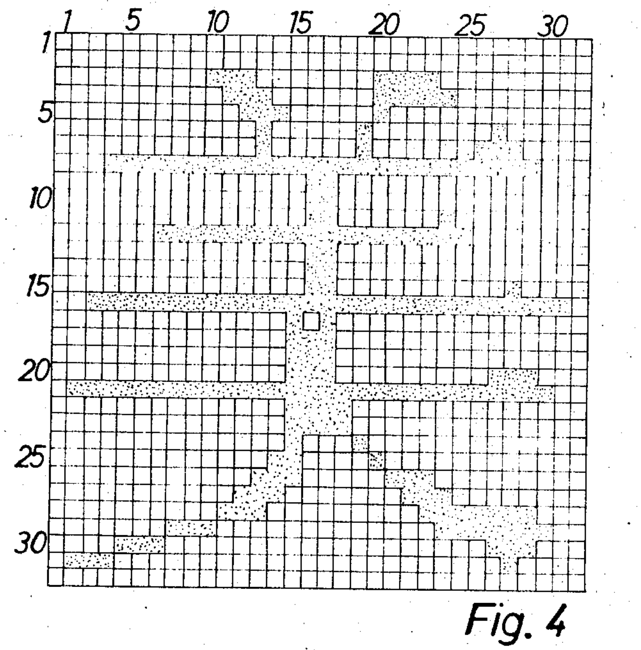
FIG. 4 is a character pattern restored in accordance with this invention.
Figure 5:
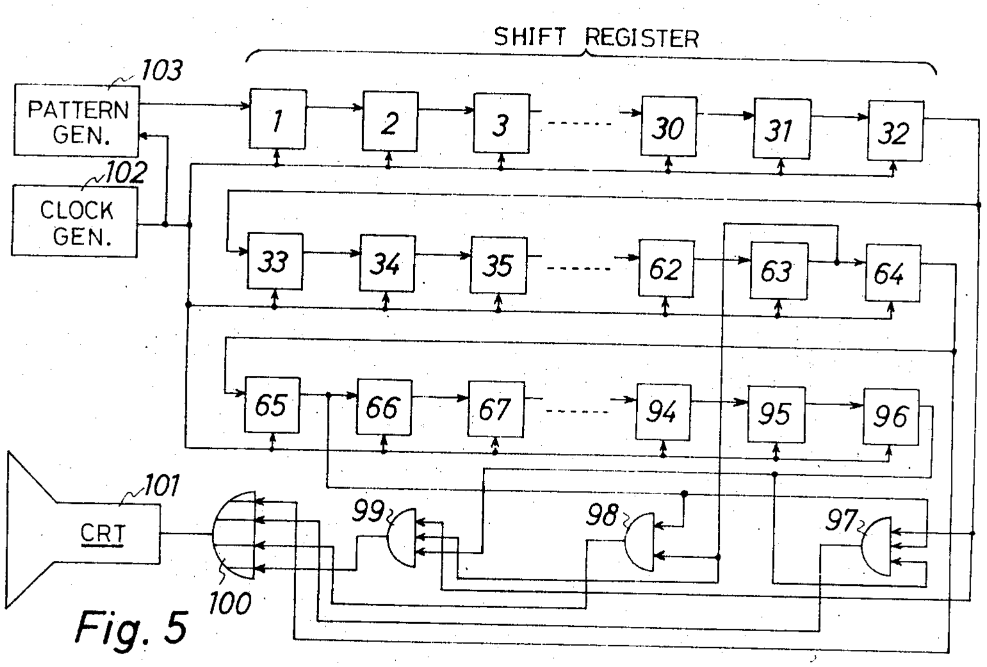
FIG. 5 is a block diagram illustrating another embodiment of this invention.

Accordingly, an AND circuit 97 generates an output when the right dot and the left dot stored in one (e.g. a bistable circuit 64) of the bistable circuits 1 to 96 assume sumultaneously ON-states. An AND circuit 98 generates an output when the upper dot and the lower dot of a dot stored in one (e.g. a bistable circuit 64) of the bistable circuits 1 to 96 assume simultaneously ON-states together with an ON-state of either one (e.g.; a bistable circuit 32) of the bistable circuits 32 and 96 which store respectively the right and left dots of the dot stored in the bistable circuit 64. An AND circuit 99 generates an output when the upper and lower dots of a dot stored in one (e.g. a bistable circuit 64) of the bistable circuits 1 to 96 assume simultaneously ON-states together with an ON-state of the other (e.g. a bistable circuit 96) of the bistable circuits 32 and 96 which store respectively the right and left dots of the dot stored in the bistable circuit 64. An OR circuit 100 generates an output when at least one of the AND circuits 97, 98 and 99 and the bistable circuit 64 generates and output thereof. The output of the OR circuit 100 is applied to a cathode ray tube 101, which is swept by a saw-tooth wave. In FIG. 4, a restored and displayed character pattern is shown. Substantial restoration of a modified character shown in FIG. 3 to an original character pattern shown in FIG. 2 will be readily understood in comparison the restored character pattern shown in FIG. 4 with the original character pattern shown in FIG. 2.

another embodiment shown in FIG. 5 is provided for character patterns having fine vertical components. The principle of this embodiment will be understood on the analogy of the principle of the embodiment shown in FIG. 1. In this embodiment, an AND circuit 97 generates an output when the right and left dots of a dot stored in one (e.g. a bistable circuit 64) of the bistable circuits 1 and 96 assume simultaneously ON-stafes together with an ON-state of ithe one (e.g. a bistable circuit 65) of the bistable circuits 63 and 65 which store respectively the upper and lower dots of the dot stored in the bistable circuit 64. An AND circuit 98 generates an output when the upper and lower dots of a dot stored in one (e.g. a bistable circuit circuit 64) of the bistable circuits 1 to 96 assume simultaneously ON-states. An AND circuit 99 generates an output when the right and left dots of a dot stored in one (e.g. a bistable circuit 64) of the bistable circuits 1 to 96 assume simultaneously ON-states together with an ON-state of the other (e.g. a bistable circuit 63) of the bistable circuits 63 and 65 which store respectively the upper and lower dots of the dot stored in the bistable circuit 64. Other constructions are the same as the embodiment shown in FIG. 1. A restored pattern obtained by the embodiment is omitted.

Figure 6:
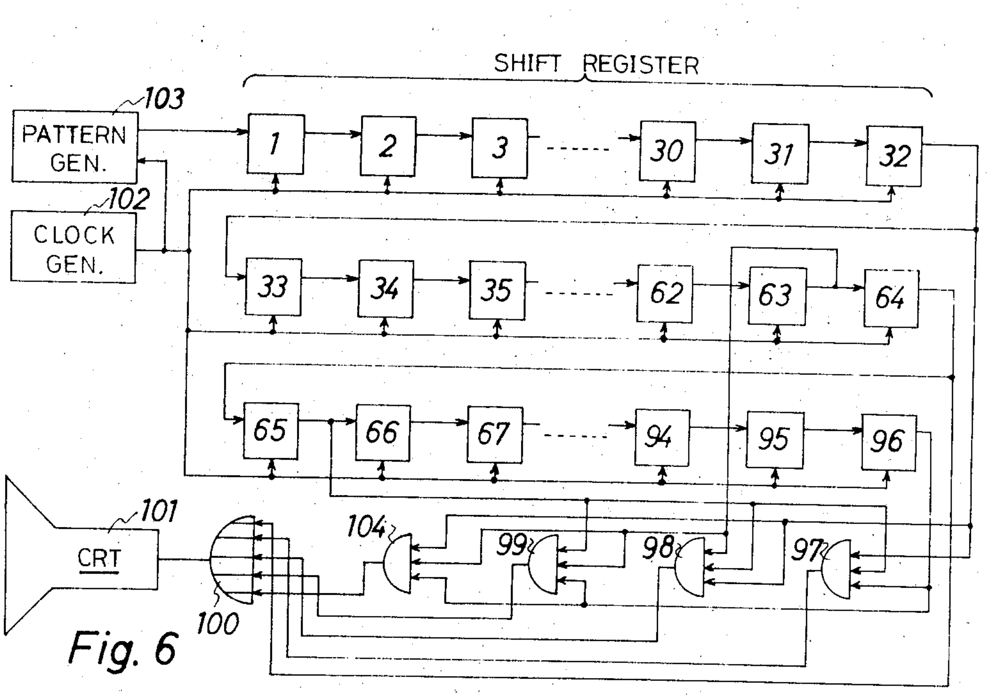
FIG. 6 is a block diagram illustrating another embodiment of this invention.

Another embodiment shown in FIG. 6 is provided for character patterns of Gothic type having thick bilateral and vertical components. The principle of this embodiment will be understood on the analogy of the embodiments shown in fIGS. 1 and 5. In this embodiment, an AND circuit 97 generates an output when the right and left dots of a dot stored in one (e.g. a bistable circuit 64) of the bistable circuits 1 to 96 assume simultaneously ON-states together with an ON-state of either one (e.g. a bistable circuit 65) of the bistable circuits 63 and 65 which store respectively the upper and lower dots stored in the bistable circuit 64. An AND circuit 98 generates an output when the upper and lower dots of a dot stored in one (.e.g. a bistable circuit 64) of the bistable circuits 1 to 96 assume simultaneously ON-states together with an ON-state of either one (e.g. a bistable circuit 32) of the bistable circuits 32 and 96 which store respectively the right and left dots of the dot stored in the bistable circuit 64. An AND circuit 99 generates an output when the upper and lower dots of a dot stored in one (e.g. (.e.g a bistable circuit 64) of the bistable circuits 1 to 96 assume simultaneously ON-states together with an ON-state of the other (e.g. a bistable circuit 96) of the bistable circuits 32 and 96 which store respectively the right and left dots of the dot stored in the bistable circuit 64. An AND circuit 104 generates an output when the right and left dots of a dot stored in one (e.g. a bistable circuit 64) of the bistable circuits 1 to 96 assume simultaneously ON-states together with an ON-state of the other one (e.g. a bistable circuit 63) of the bistable circuits 63 and 65 which store respectively the upper and lower dots stored in the bistable circuit 64. Other constructions are similar to the embodiments shown in FIGS. 1 and 5.

Figure 7:
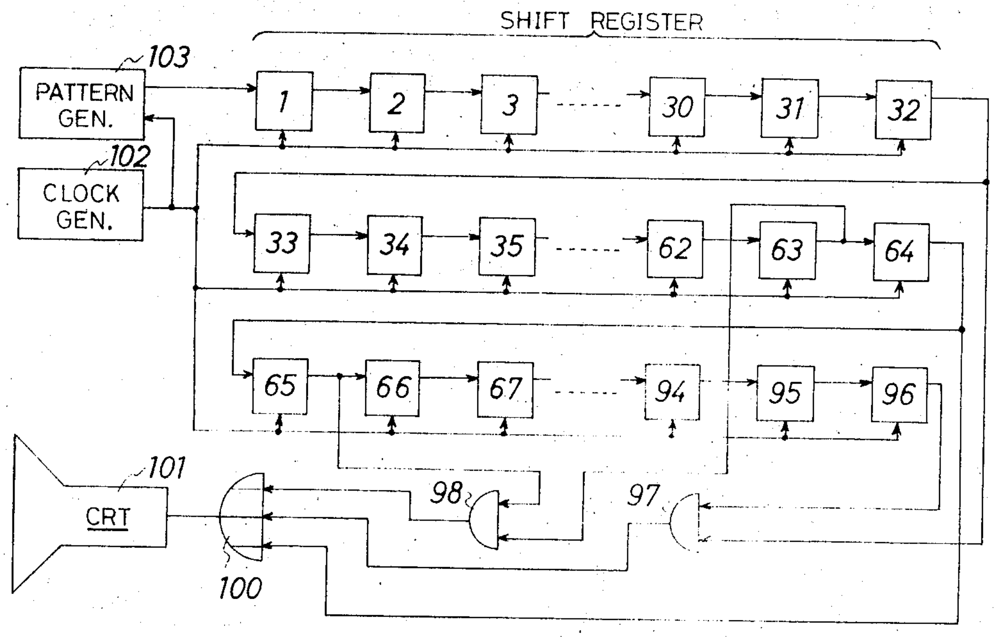
FIG. 7 is a block diagram illustrating another embodiment of this invention.

Another embodiment shown in FIG. 7 is provided for character patterns having fine bilateral and vertical components. The principle of this invention will be understood on the analogy of the above embodiments. In this embodiment, an AND circuit 97 generates an output when the right dot and the left dot of a dot stored in one (e.g. a bistable circuit 64) of the bistable circuits 1 to 96 assume simultaneously ON-states. An AND circuit 98 generates an output when the upper and lower dots of a dot stored in one (e.g. a bistable circcuit 64) of the bistable circuits 1 to 96 assume simultaneously ON-states. An OR circuit 100 generates an output when at least one of the AND circuits 97 and 98 and the bistable circuit 64 assumes an ON-state.

In each of the above mentioned embodiments, the shift register may be replaced by another memory device if the memory device can simultaneously store one dot, a right dot of the one dot, a left dot of the one dot, the upper dot of the one dot and the lower dot of the one dot in a dot-type pattern, so that successive ones of all dots of the dot-type pattern are successively stored as the above one dot in the memory device. In the above embodiments, the one dot is stored in the memory element 64.

The above mentioned clock pulses are supplied together with the modified dot-typed patterns or regenerated from the modified dot-typed patterns transmitted in an actual case.

As understood from the above embodiments, some dots of a dot-typed pattern omitted in the pattern generator 103 or in the transmission medium because of noise are restored irrespective of the states of the dots if upper and lower dots and right and left dots adjacent to each of the omitted dots assume predetermined states determined in consideration of the characteristics of the pattern.

What I claim is:

1. A restoration system for restoring omitted dots of dot-typed patterns indicated by an alternate arrangement of black dots and white dots in bilateral scanning lines and vertical scanning lines comprising:

memory means comprising a number of bistable memory elements for simultaneously storing one dot of each of the dot typed patterns and at least a right dot, a left dot, an upper dot and a lower dot of said one dot, means connected to said memory means for shifting said dots in said memory means in synchronism with the clock timing of the dot-typed patterns.

detection means coupled to said memory means for generating a detected output when the right dot, the left dot, the upper dot and the lower dot assume predetermined states determined in accordance with the characteristics of the dot-typed patterns, and means coupled to said memory means and said detection means for obtaining in the same clock timing as the dot-typed patterns a logical sum of said one dot and said detected output of said detection means so as to provide restored patterns.

2. A restoration system for restoring omitted dots of dot typed patterns indicated by an alternate arrangement of black dots and white dots in bilateral scanning lines and vertical scanning lines comprising:

shift register means comprising a number of bistable memory elements for simultaneously storing one dot of each of the dot typed patterns and at least a right dot, a left dot, an upper dot and a lower dot of said one dot, means connected to said shift register means for shifting said dots in said shift register means in synchronism with the clock timing of the dot-typed patterns, detection means coupled to said shift register means for generating a detected output when the right dot, the left dot, the upper dot and the lower dot assume predetermined states determined in accordance with the characteristics of the dot-typed patterns, and means coupled to said shift register means and said detection means for obtaining in the same clock timing as the dot-typed patterns a logical sum of said one dot and said detected output of said detection means so as to provide restored patterns.

3. A restoration system according to claim 2, in which said detection means comprises a first AND circuit for providing a logical product of said right dot and said left dot, and a second AND circuit for providing a logical product of said upper dot and said lower dot.

4. A restoration system according to claim 2, in which said detection means comprises a first AND circuit for providing a logical product of said right dot and said left dot, a third AND circuit for providing a logical product of said upper dot, said lower dot and one of said right and left dots, and a fourth AND circuit for providing a logical product of said upper dot, said lower dot and the other of said right and left dots.

5. A restoration system according to claim 2, in which said detection means comprises a second AND circuit for providing a logical product of said upper dot and said lower dot, a fifth AND circuit for providing a logical product of said right dot, said left dot and one of said upper and lower dots, and a sixth AND circuit for providing a logical product of said right dot, said left dot and the other of said upper and lower dots.

6. A restoration system according to claim 2, in which said detection means comprises a sixth AND circuit for providing a logical product of said right dot, said left dot and the other of said upper and lower dots, a fourth AND circuit for providing a logical product of said upper dot, said lower dot and the other of said right and left dots, a fifth AND circuit for providing a logical product of said right dot, said left dot and one of said upper and lower dots, and a third AND circuit for providing a logical product of said upper dot, said lower dot and one of said right and left dots.

* * * * *